June 4, 1929. M. A. POSSONS 1,716,183
VALVE FOR STOVE BURNER LIGHTERS
Filed Oct. 11, 1927
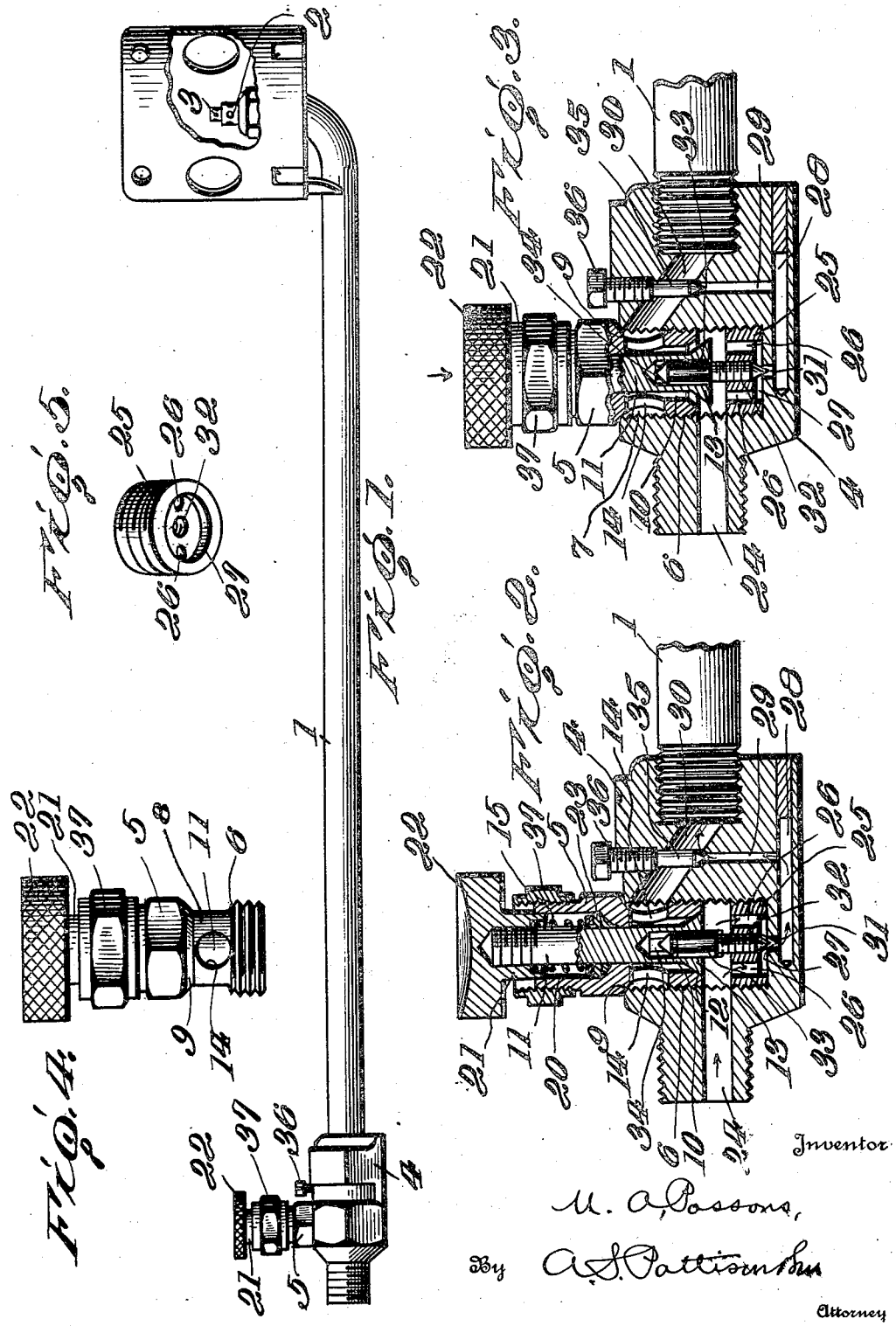

Patented June 4, 1929.

1,716,183

UNITED STATES PATENT OFFICE.

MINARD A. POSSONS, OF CLEVELAND, OHIO, ASSIGNOR TO AMERICAN STOVE COMPANY, OF ST. LOUIS, MISSOURI, A CORPORATION OF NEW JERSEY.

VALVE FOR STOVE-BURNER LIGHTERS.

Application filed October 11, 1927. Serial No. 225,552.

This invention pertains to improvements in valves for stove burner lighters and the primary object of the invention is to control by a single valve, both the pilot light and the flames for lighting the stove burners.

Those skilled in this art understand that lighters of the type herein disclosed are mounted in the open burner part of a gas range and the like, and are located substantially equal distances from the several burners, and that by pushing on a valve, the flames shoot out laterally and reach any burner that may be turned on for the purpose of lighting the same.

As is well understood, lighters of the type here disclosed involve a pilot flame that is constantly burning, and the special object of the present invention comprises a reciprocating and rotating valve whereby when the valve is reciprocated, the conduits for the flow of gas and the lighter flames is controlled and by turning the same valve, the pilot light may be also turned off.

In the operation of lighters of the character herein set forth, it is desired that convenient means may be provided whereby the housewife can cut off the flow of gas to the pilot light, thus extinguishing it, or turning the same on at will. Such lighters as now used have no means provided whereby the said lighters can be conveniently extinguished, for instance when the housewife is leaving for a vacation, or for any length of time, she can not conveniently extinguish the said pilot light and conveniently turn on the gas for lighting the pilot.

By means of the present invention which involves a reciprocating valve for turning on the gas for the lighting flame and making the same valve capable of being rotated, the operator can conveniently cut off the fuel for the pilot light by the operation of the same valve that feeds the fuel for the lighting flames.

Referring more specifically to the present improvement, a reciprocating valve is provided for controlling the lighting flames, and a screw valve for controlling the pilot flame so that by turning the reciprocating valve, the screw valve is either closed or opened.

In the accompanying drawings:

Figure 1 is a side elevation of a lighter which embodies the improved valve.

Figure 2 is an enlarged longitudinal sectional view through the reciprocating and the screw valve, the parts being shown in positions to cut off the lighter flames but leaving on the fuel for the pilot light.

Figure 3 is a view similar to Figure 2 except that the lighter valve is depressed, making communication with the lighter flames while at the same time not disturbing the screw valve that controls the fuel to the pilot flame.

Figure 4 is a detached side elevation of the sub-housing.

Figure 5 is a detached perspective view of the member 25.

It is well known to those skilled in the art that lighters embodying a reciprocating valve for controlling the lighter flames have been known and have been in use for a long time for lighting burners in the open part of gas ranges. So far as I am aware, the reciprocating valve has only controlled the lighting flames. My present improvement provides making the reciprocating valve also capable of rotation so that the rotation of the reciprocating valve will serve to close a screw valve that controls the flow of fuel to the pilot light. Such construction that involves in a single valve both functions is, so far as I am aware, new.

Referring now to the accompanying drawings, 1 is a pipe that carries at its outer end a lighter 2, the said lighter having at its end a pilot light 3, and the other end of the pipe 1 carries a valve housing 4. Thus far I have explained the usual construction.

In carrying out the present improvements I employ a sub-valve housing 5 that has its lower end 6 screw-threaded and in engagement with screw threads formed on the inner side of a passageway 7. This lower portion has an intermediate reduced part 8. The upper portion 5 of this sub-housing is enlarged and its lower end 9 is suitably tapered so that when the sub-housing 5 is screwed into the screw-threaded passageway, it engages the upper end of the screw-threaded portion and makes a tight joint therewith.

The sub-housing 5 and the lower end thereof are provided with a vertical opening 10 through which a valve stem 11 passes. The lower end of the sub-valve housing is tapered as shown at 12, with which a tapered valve 13 on the lower end of the valve stem 11 engages for the purpose of closing the said opening 10. Passing through the reduced portion 8 from side to side is an opening 14, the outer ends of the opening communicating with the space formed by the reduced portion 8. A suitable spring 15 is located within an opening 20 formed in the upper part of the said sub-housing 5, the upper end of the said spring abutting against the inner end 21 of a push button 22 that is screwed on the upper end of the valve stem 11, while the lower end of the spring engages the lower end of the enlarged opening 20 or it may rest upon a suitable washer 23. It will thus be seen that this spring 15 normally holds the valve stem and its operating member 22 outward whereby the valve 13 at the lower end of the stem is normally closed.

In the construction here shown, the fuel passes in the housing 4 through a passageway 24 and below the valve 13. Located in the lower end of the screw-threaded portion of the housing 4 is a member 25 that has a passageway or passageways 26, the said passageway 26 communicating with an opening 27 located between the member 25 and the lower end of the housing opening. Formed laterally in the housing 4 is a fuel passageway 28 which communicates with a vertical passageway 29 that has its upper end in communication with a diagonal passageway 30 which has its lower end communicating with the adjacent end of the pipe 1. For the purpose of forming a communication between the space 27 and the passageway 28, a vertical passageway 31 passes through the bottom of the opening in the housing 4. This passageway 31 is controlled by a screw-threaded valve 32, its lower end preferably being tapered as shown for controlling the said passageway 31. This screw valve 32 screws into a suitable opening formed in the member 25 and its upper end or stem 33 is formed angular and fits loosely in an elongated opening 34 of angular cross-sectional shape formed in the lower end of the valve stem 11. This angular portion 33 having engagement with the angular opening 34 unites the screw valve and the valve stem 11 for rotation but at the same time due to the elongated opening 34 and sliding connection between it and the screw valve stem portion 33 the valve stem and the valve 13 can be moved vertically without depressing or rotating the said screw valve. A pointed valve 35 controls the upper end of the passageway 29 and its stem 36 passes through the housing 4 which provides means for regulating the flow of fuel to the pilot burner. This valve 35 is set at the factory and remains as set.

The operation of the parts is obvious, with the parts in the position shown in Figure 2. When the valve stem 11 is depressed as shown in Figure 3, then the valve 13 is unseated and fuel flows upward around the valve stem and through the opening 14 to the opening 30, thence to the pipe 1 and to the lighter 2, causing the flames to flow laterally for lighting the burners and without affecting the pilot valve 32. Hence this lighter flame may be turned on or cut off at will. When the housewife desires to leave for any considerable length of time and wants to put out the fire by cutting off the flow of fuel thereto, this is accomplished by turning the valve push button 22 to the right and this will cause the valve 32 to set tightly on the upper end of the opening 31, thus cutting off all flow of fuel to the pilot burner. When it is desired to light the pilot burner again, then the operator turns the button 22 to the left which will lift the screw valve 32, allowing fuel to flow through the passageways 28, 29 and 30 to the tube 1 and thence to the pilot burner.

Lighters of the character described have heretofore had the usual valve 35 but these valves have required the use of a screw driver or wrench and these valves should be set and remain at a proper predetermined distance to enable the proper flow of fuel to the pilot burner. The valve 32 is not intended to regulate this pilot light. It is only to extinguish it and then to turn it on again. The means for doing this are convenient. It simply means merely turning the button 22 of the reciprocating valve when the fuel to the pilot light will be cut off.

I have described the invention in detail but I wish it understood that variations in the construction here shown may be made without departing from the present invention so long as it comes within a fair interpretation of the appended claims.

Having described my invention, what I desire to claim and secure by Letters Patent is:

1. An improved combined lighter and pilot light valve comprising a reciprocating and rotating valve, the reciprocation of the valve controlling the lighter flames, and a screw valve positioned below the reciprocating valve and controlling the pilot flame, and said screw valve operatively connected with the said reciprocating and rotating valve for the purpose described.

2. Improved lighter and pilot valves including a reciprocating and rotating valve, said reciprocating valve adapted by being reciprocated to control the lighting flame, and a screw-threaded valve controlling the pilot flame, said screw-threaded valve connected for rotation with the reciprocating valve and the reciprocating valve moving freely upon the screw-threaded valve, the parts operating as described.

3. An improved valve for controlling a lighter and a pilot, comprising a housing, a reciprocating and rotating valve within the said housing, a passageway through the said housing for delivering fuel to the lighter, the reciprocating and rotating valve movable in respect to and controlling the said passageway, a screw-threaded valve located below the said reciprocating valve, said housing having a pilot light passageway communicating with the pilot light, the screw valve controlling the said pilot passageway, the upper end of the screw valve engaging the reciprocating valve for rotation therewith, but permitting the reciprocating valve to reciprocate independently of the screw valve whereby the parts operate as specified.

4. An improved combined lighter and pilot light valve comprising a reciprocating and rotatable valve for controlling the lighting flame, and a rotatable valve for controlling the pilot flame operatively connected with the reciprocating valve, whereby both valves are operated by the reciprocating and rotating valve.

5. An improved combined lighter and pilot light valve comprising a reciprocating valve for controlling the lighting flame, a rotatable valve for controlling the pilot flame, and an external reciprocating and rotating member adapted to operate the reciprocating and the rotating valve for the purpose specified.

6. An improved valve for a lighter and a pilot comprising a housing, a sub-housing fitting therein and having a vertical passageway, the lower end of which forms a valve seat, a reciprocating valve engaging the said seat having a stem passing through and beyond said sub-housing and carrying at its outer end means for reciprocating the valve, a lighter passageway in said housing for feeding fuel to the lighter, a pilot passageway immediately below said reciprocating valve for conveying fuel to the pilot light, the reciprocating valve provided in its bottom with a vertical elongated opening, a screw valve controlling the pilot fuel passageway, said valve having its upper end in engagement with the elongated opening of the reciprocating valve in a manner to cause the valves to rotate together but permit independent vertical movement of the reciprocating valve, the parts combined for the purpose described.

7. An improved combined lighter and a pilot light valve comprising a reciprocating and rotating valve and a screw valve, the reciprocation of the reciprocating valve controlling the lighter flames and the rotation of the screw valve controlling the pilot flame, and said screw valve having sliding connection with the reciprocating valve, for the purpose described.

8. An improved combined lighter and pilot light valve, comprising a reciprocating and rotating valve and a screw valve, the reciprocating valve controlling the lighter flames and the screw valve controlling the pilot flame, the reciprocating valve provided with an elongated opening of angular shape in cross-section, and the screw valve provided with an end of angular shape in cross-section extending into said reciprocating valve opening, and said valves through said connection being united for rotation but independent of one another as to reciprocation.

9. An improved combined lighter and pilot light valve, comprising a reciprocating and rotating valve controlling the lighter flames, and a screw valve controlling the pilot flame, and connection between the lower end of the reciprocating valve and the screw valve uniting these valves for rotation but permitting independent reciprocation of the reciprocating valve, for the purpose described.

In testimony whereof I hereunto affix my signature.

MINARD A. POSSONS.